(12) United States Patent
Thomsen et al.

(10) Patent No.: US 12,135,012 B2
(45) Date of Patent: Nov. 5, 2024

(54) REDUCTION OF EDGEWISE VIBRATIONS USING BLADE LOAD SIGNAL

(71) Applicant: VESTAS WIND SYSTEMS A/S, Aarhus N (DK)

(72) Inventors: Jesper Sandberg Thomsen, Hadsten (DK); Morten Bro, Aalborg (DK); Ian Couchman, Horley (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 156 days.

(21) Appl. No.: 17/615,060

(22) PCT Filed: May 26, 2020

(86) PCT No.: PCT/DK2020/050147
§ 371 (c)(1),
(2) Date: Nov. 29, 2021

(87) PCT Pub. No.: WO2020/239177
PCT Pub. Date: Dec. 3, 2020

(65) Prior Publication Data
US 2022/0220936 A1 Jul. 14, 2022

(30) Foreign Application Priority Data
May 28, 2019 (DK) .......................... PA 2019 70335

(51) Int. Cl.
*F03D 7/00* (2006.01)
*F03D 7/02* (2006.01)
(52) U.S. Cl.
CPC ......... *F03D 7/0224* (2013.01); *F03D 7/0296* (2013.01); *F05B 2260/966* (2013.01);
(Continued)

(58) Field of Classification Search
CPC ................ F03D 7/0224; F03D 7/0296; F05B 2260/966; F05B 2270/328;
(Continued)

(56) References Cited

U.S. PATENT DOCUMENTS 9,453,760 B2 * 9/2016 Lysen ..................... G01H 1/003
2008/0219850 A1 * 9/2008 O'Connor ............. F03D 1/0608
416/223 R (Continued)

FOREIGN PATENT DOCUMENTS

CN 105673325 A 6/2016
CN 109072872 A 12/2018
(Continued)

OTHER PUBLICATIONS

Jason Laks et al: "Multi-Blade Coordinate and Direct Techniques for asymptotic disturbance rejection in wind turbines," Decision and Control (CDC), 2012 IEEE 51st Annual Conference on, IEEE, Dec. 10, 2012 (Dec. 10, 2012), pp. 2557-2562.
(Continued)

*Primary Examiner* — Matthew T Largi
(74) *Attorney, Agent, or Firm* — Patterson + Sheridan, LLP

(57) ABSTRACT

The present invention relates to a rotor control system for actuating pitch of pitch adjustable rotor blades of a wind turbine in order to reduce edgewise blade vibrations. The system comprises a pitch actuation unit being arranged to receive an edgewise load signal and apply m-blade coordinate transformations, such as the Coleman transformations, to the edgewise load signal. Based on a selected signal component at either a backward whirling frequency or a forward whirling frequency, a modified modification signal is obtained.

16 Claims, 3 Drawing Sheets

(52) U.S. Cl.
CPC ... *F05B 2270/328* (2013.01); *F05B 2270/331* (2013.01); *F05B 2270/334* (2013.01); *F05B 2270/342* (2020.08); *F05B 2270/703* (2013.01)

(58) Field of Classification Search
CPC .......... F05B 2270/331; F05B 2270/334; F05B 2270/342; F05B 2270/703; F05B 2270/808
See application file for complete search history.

(56) References Cited

U.S. PATENT DOCUMENTS

| | | | |
|---|---|---|---|
| 2011/0158806 A1 | 6/2011 | Arms et al. | |
| 2011/0229300 A1* | 9/2011 | Kanev | F03D 7/043 415/33 |
| 2012/0257967 A1* | 10/2012 | Egedal | F03D 7/0224 416/1 |
| 2019/0154001 A1* | 5/2019 | Østergaard | F03D 7/0296 |

FOREIGN PATENT DOCUMENTS

| | | | | |
|---|---|---|---|---|
| CN | 109563812 A | | 4/2019 | |
| EP | 2447527 A1 | | 5/2012 | |
| EP | 4239187 A1 | * | 9/2023 | ............. F03D 17/00 |
| WO | 2017092773 A1 | | 6/2017 | |
| WO | 2017174094 A1 | | 10/2017 | |
| WO | WO-2018033190 A1 | * | 2/2018 | ........... F03D 7/0224 |
| WO | 2019042515 A1 | | 3/2019 | |
| WO | 2019086092 A1 | | 5/2019 | |
| WO | 2020239177 A1 | | 12/2020 | |

OTHER PUBLICATIONS

Kausihan Selvam: "Individual Pitch Control for Large scale wind turbines Multivariable control approach," dated Jul. 25, 2007, pp. 1-5.
Pieter M O Gebraad et al: "LPV subspace identification of the edgewise vibrational dynamics of a wind turbine rotor," Control Applications (CCA), 2011 IEE International Conference on , IEEE, Sep. 28, 2011, pp. 37-42.
PCT, International Search Report and Written Opinion of the International Searching Authority for Application PCT/DK2020/050147 dated Jan. 9, 2020.
Danish Patent and Trademark Office, 1st Technical Examination including The Search Report for Patent Application PA 2019 70335 dated Nov. 28, 2019.
Chinese Patent Office, Office Action for Chinese Patent Application No. 202080057373.6, dated Dec. 29, 2023.

* cited by examiner

REDUCTION OF EDGEWISE VIBRATIONS USING BLADE LOAD SIGNAL

FIELD OF THE INVENTION

The present invention relates to control of a wind turbine to reduce structural loading due to vibrations of the blades along the edgewise direction.

BACKGROUND OF THE INVENTION

Wind turbines as known in the art comprises a wind turbine tower supporting a nacelle and a rotor with a number of pitch-adjustable rotor blades.

A wind turbine is prone to vibrations since it comprises a large mass placed at the end of a slender tower. Examples of these vibrations include nacelle movement and blade movement. It is known in the art that certain types of vibrations can be damped by actively pitching of the blades and/or adjusting the generator torque. Edgewise vibrations are generally undesirable as the blades are typically weakly damped in that direction, and there is a higher risk of damaging the blades due to vibrations along the edgewise direction, than along the flapwise direction.

To eliminate harmful vibrations of the blades it is known to shut down the wind turbine for a period of time if potentially damaging edgewise vibrations of the blades are detected. But if these vibrations are detected often, this method will reduce the overall output of the wind turbine. As an alternative active pitching to dampen the edgewise vibrations can be applied.

WO 2018/019345 discloses one example of a solution to mitigate edgewise vibration by use of pitch. Here it is disclosed that based on a motion parameter of the edgewise rotor blade vibration a blade pitch angle control signal is generated so that a resulting force on the rotor blade is opposite and proportional to the edgewise rotor blade vibration velocity.

Nevertheless, there is a need in the art for further ways of mitigating edgewise blade vibrations.

SUMMARY OF THE INVENTION

It would be advantageous to achieve an improved manner of reducing vibrations in a wind turbine. In this regard it would be desirable to provide a control system which can instruct a pitch actuator in a manner that assists in reducing edgewise vibrations of the rotor blades of a wind turbine.

Accordingly, in a first aspect, there is provided a rotor control system for actuating pitch of pitch adjustable rotor blades of a wind turbine, the rotor control system comprises a pitch actuating unit for determining a pitch modification signal to be applied to a pitch actuator for actuating the pitch of the pitch adjustable rotor blades;

the pitch actuation unit being arranged to:
receive an edgewise load signal for each of the adjustable rotor blades, the edgewise load signal being measured in a rotating reference frame;
apply an m-blade coordinate transformation to the edgewise load signal to transform the signal to a whirling reference frame along a first and a second reference direction;
select the signal component of either the first or the second reference direction to obtain a selected signal component;
filter the selected signal component at either a backward whirling frequency or a forward whirling frequency to obtain a filtered signal component;
apply an inverse m-blade coordinate transformation to the filtered signal component to obtain the pitch modification signal;
apply the pitch modification signal to the pitch actuator.

The present invention provides a rotor control system which uses a pitch modification signal for actuating pitch of pitch adjustable rotor blades to obtain a reduction in edgewise vibrations of the blades of the turbine. The pitch modification signal is based on an m-blade coordinate transformation based on an input signal. An m-blade coordinate transformation transforms a signal between coordinate reference frames. While it is generally known to apply m-blade coordinate transformations in connection with pitch actuation, it is generally done in connection with transforming same quantities between rotating and stationary reference frames. The inventors of the present invention have realized that by proper application of m-blade coordinate transformations, together with signal filtering, it is possible to use the pitch system to create a moment (or in-plane force) in response to an edgewise load signal, possibly in the form of a measured edgewise blade root bending moment, that have an attenuating effect on edgewise vibrations in the blades. And here it should be noted that since the input signals are based on a load signal, and not a velocity signal, the resulting attenuating effect is not to be understood as a damping effect, rather the system creates a disturbance which reduces the vibration of the blade.

The m-blade coordinate transformation will transform the signal to a reference frame. This reference frame is not easily visualized since it depends on the rotational speed and the pitch angle. It is referred to as a whirling reference frame along a first and a second reference direction. It has been realized that by filtering a signal component of either the first or the second reference direction at either a backward whirling frequency or a forward whirling frequency the controller will target only the selected whirling mode of either the backward or forward whirling.

The inventors of the present invention have thus realized that by proper signal treatment of an edgewise load signal, a pitch signal can be determined which eliminates or at least reduces edgewise vibrations of the blades. As wind turbine blades grow larger, and as wind turbine towers grow higher the problem with edgewise blade vibrations increases. High towers risk increasing the edgewise blade vibrations via a coupling between torsional movement of the tower and the edgewise vibrational modes. The invention provides a solution which based on blade sensors and a controller can determined a pitch modification signal to be applied to the pitch actuator. This is a more cost-effective solution than either stiffening of wind turbine blades or the wind turbine tower.

The m-blade transformation is also referred to in the art as a multi-blade transformation. In an embodiment the m-blade coordinate transformation is a Coleman transformation. However other transformations may also fall in the category of m-blade coordinate transformations, hereunder so-called d-q transformation and Park transformation or similar transformations. It is within the abilities of the skilled person to determine an alternative transformation which may not strictly be a Coleman transformation, but which operates in an equivalent manner.

As used herein, the m-blade transformation is applied both as is (i.e. without a prefix) and in an inverse form. In general the m-blade transformation is a transformation between a first coordinate frame and a second coordinate frame, and the m-blade transformation takes signal from the first frame to the second frame, whereas the inverse m-blade transformation takes the signal from the second frame to the first frame. In this regard signals may be measured, modified and actuated in same or different coordinate frames. In an embodiment the m-blade coordinate transformation takes a signal comprising three components measured in a rotating coordinate frame, i.e. one signal obtained for each rotating blade, and transforms the signal into a reference frame of two components. The inverse m-blade transformation takes the two signal components and transforms them back to the three component rotating frame to provide signal components (the pitch modification signals) which can be imposed onto the three pitch actuators. This embodiment is applicable to a three-bladed wind turbine. For a turbine with a different number of blades, the m-blade transformations need to be adjusted accordingly.

In an embodiment, the inverse m-blade coordinate transformation is taking as input a first signal and a second signal. In such an embodiment, the second signal may be determined by further filtering the filtered signal with a further signal filter with a quadrature phase shift filter phase response.

The inventors of the present invention have realized that by determining the second signal by filtering the first signal with a signal filter with a quadrature phase shift filter phase response, then the pitch actuation signal is altered in a manner where the actuation at one of the two actuating frequencies is reduced or even removed while still obtaining a vibration reducing effect. In this way the actuator's pitching activity can be reduced, and thereby reduce the fatigue exposure on the pitching actuators.

The second signal is determined by filtering the first signal with a signal filter with a quadrature phase shift filter phase response. A quadrature phase shift filter may also be referred to as a 90° phase-shift filter, however it is to be understood, that a 90° phase-shift is not always obtained as the exact phase-shift may depend on the conditions under which the filter is applied. However, in ideal situations a quadrature phase shift filter shifts the filtered signal by 90°. In general the quadrature phase shift filter may be understood as a filter with an ideal phase shift of 90°, but which under working conditions, may obtain a phase shift which is not exactly 90°, but can be approximately 90°, such as 90°±15°.

In an embodiment the signal filter is a leaky integrator. In general other types of filters with a quadrature phase shift may also be used, examples include a general first order low pass filter and a differential filter.

In a further aspect, the invention relates to a wind turbine comprising the rotor control system according the first aspect. In yet further aspects, the invention relates to a method of actuating pitch of pitch adjustable rotor blades of a wind turbine and to a computer program product. The computer program product may be provided on a computer readable storage medium or being downloadable from a communication network. The computer program product comprises instructions to cause a data processing system, e.g. in the form of a controller, to carry out the instruction when loaded onto a data processing system.

In general, the rotor control system may be implemented on a unit or collection of functional units which comprises one or more processors, input/output interface(s) and a memory capable of storing instructions can be executed by a processor.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
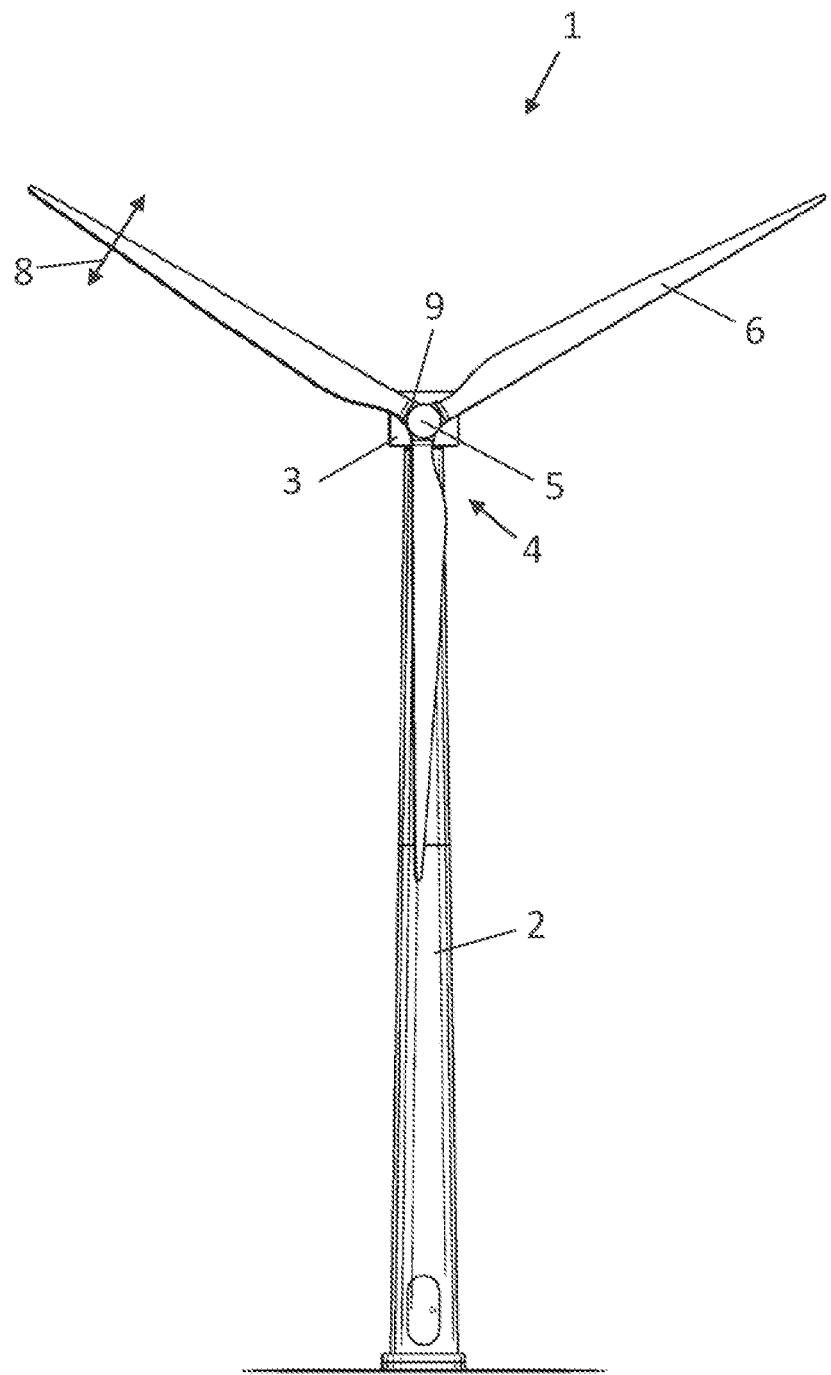
FIG. 1 illustrates, in a schematic view, an example of a wind turbine.

FIG. 1 illustrates, in a schematic view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle, in the tower or distributed at a number of locations inside (or externally to) the turbine and communicatively connected. The rotor blades are pitch-adjustable. The rotor blades can be adjusted in accordance with a collective pitch setting, where each of the blades are set to the same pitch value. In addition to that, the rotor blades are adjustable in accordance with individual pitch settings, where each blade may be provided with an individual pitch setpoint.

Each rotor blade of the turbine may vibrate in the edgewise direction 8, that is vibrations or oscillations along the chord between the trailing edge and the leading edge of the blade. In general when referring to 'an edgewise rotor blade vibration' such reference is made to the first edgewise bending mode, however the disclosure made herein is also relevant to higher order edgewise bending mode with the appropriate adaptations. An edgewise vibration may be measured and/or detected in different manners. In one embodiment, the edgewise vibration is measured at the blade root 9 by means of blade load sensors placed at each blade root in a manner so that the sensor detects loading in the edgewise direction. Such sensor may in embodiments be a strain gauge sensor or an optical Bragg-sensor. As the sensors are placed on the rotating blade, such edgewise load signals for each of the adjustable rotor blades are measured in the rotating reference frame of the rotor.

Figure 2:
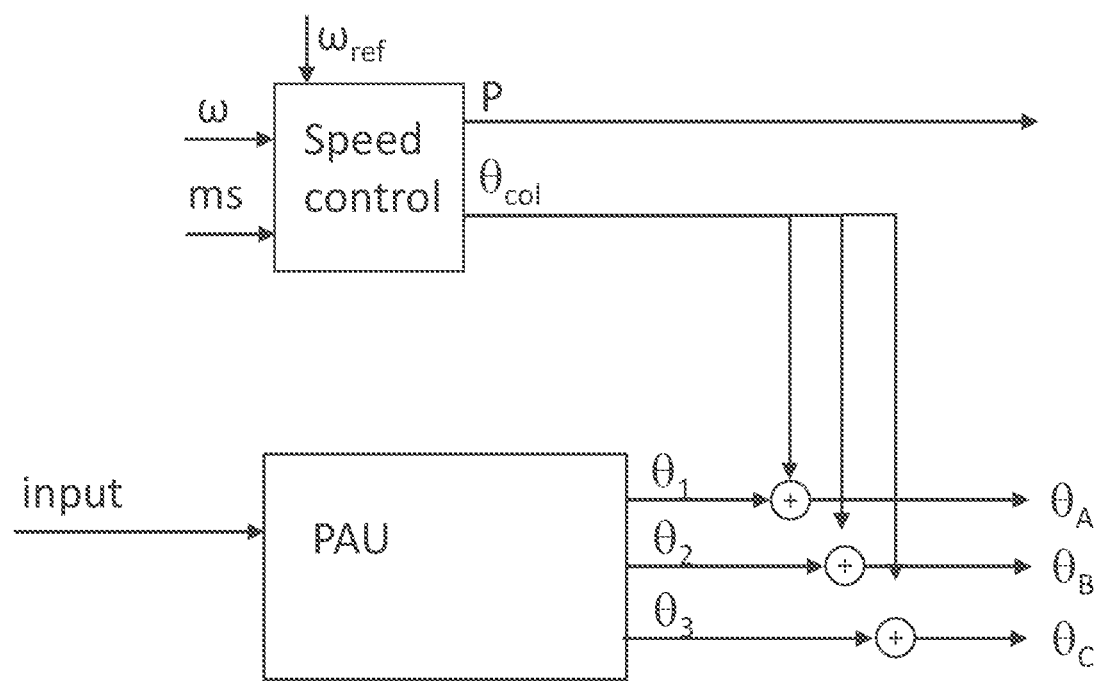
FIG. 2 is a diagram schematically illustrating an embodiment of a feedback speed controller.

FIG. 2 is a diagram schematically illustrating an embodiment of a feedback speed controller implemented to determine individual pitch actuation signals capable of reducing edgewise vibrations in accordance with embodiments of the present invention. In the illustrated implementation, the speed controller minimizes a speed error ($\omega-\omega_{ref}$) between the actual rotor speed, $\omega$, and a reference rotor speed, $\omega_{ref}$, in order to output a requested power P (in the form of a power setpoint) and a collective pitch reference, $\theta_{col}$. The collective pitch reference as determined by the speed controller, in view of the rotor speed, may also take further sensor values into account, this is referred to in FIG. 2 as a measurement set, ms, being input into the speed controller. The feedback speed controller may be implemented by a PI, PID or similar control schemes. In an embodiment, the speed controller may alternatively be a model predictive controller which based on minimizing a cost function is arranged to determine the collective pitch reference and/or the power reference.

Figure 3:
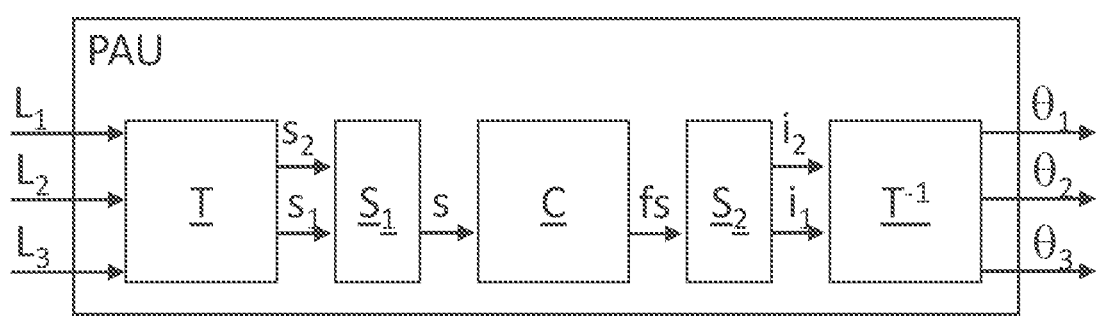
FIG. 3 schematically illustrates an embodiment of a pitch actuation unit with a Coleman transformation computing block.

FIG. 2 further illustrates a vibration reducing control block referred to as pitch actuation units (PAU). In the pitch actuation unit pitch modification signals ($\theta_1$, $\theta_2$, $\theta_3$) are being determined based on input signal(s), the input signal being an edgewise load signal. An embodiment of the implementation of the pitch actuation unit (PAU) is illustrated in FIG. 3.

The PAU control unit determines pitch modification signals for each rotor blade which are superimposed onto the collective pitch reference to provide resulting pitch modification signals ($\theta_A$, $\theta_B$, $\theta_C$) that can be applied to the pitch actuators of the rotor blades individually, and thereby reducing edgewise blade vibrations.

In the embodiment shown in FIG. 2, a collective pitch reference for the pitch-adjustable rotor blades is being determined based on a rotor speed and a resulting pitch modification signal is being applied to the pitch-adjustable rotor blades. The resulting pitch modification signal being applied to the pitch-adjustable rotor blades individually, and for each individual blade being based on a combined signal of the collective pitch reference and the individual pitch modification signals. In an embodiment, the individual pitch modification signal is being applied in a cyclic manner.

Thus pitch actuation signals are determined for each pitch adjustable rotor blade based on the pitch modification signal for each rotor blade.

FIG. 3 schematically illustrates an embodiment of a pitch actuation unit (PAU) which based on an m-blade coordinate transformation (T) in the form of a Coleman transformation determines pitch modification signals which when applied by the pitch actuator generates pitch actuation signals that will reduce edgewise blade vibrations.

The pitch actuation unit PAU is arranged to receive an edgewise load signal for each of the adjustable rotor blades ($L_1$ to $L_3$). The edgewise load signal being measured in a rotating reference frame. The edgewise load signals are coordinate transformed by an m-blade coordinate transformation in the form of a Coleman transformation T. The Coleman transformation takes the three rotating signals into a reference frame along a first, $s_1$, and a second, $s_2$, reference direction. This reference frame may be referred to as a whirling reference frame. The output of the Coleman transform is two signals: $s_1$, $s_2$. In embodiments of the present invention, either the first or the second stationary reference direction is selected, $S_1$, to obtain a selected signal component s. The selected signal component s is filtered at either a backward whirling frequency or a forward whirling frequency to obtain a filtered signal component fs. The filtering is done with the signal block C.

The selected signal component being filtered to couple the output of the Coleman transform to a selected backward whirling component of the edgewise vibration or a selected forward whirling component so that the filtered signal component reflects the magnitude (such as the amplitude or the power) of the selected component of the backward or forward whirling.

Having extracted a measure of the strength of the selected whirling component in the stationary whirling reference frame, a corresponding pitch moment to be applied in the rotating frame is determined by the inverse m-blade coordinate transformation by use of the inverse Coleman transformation to the filtered signal component. The pitch modification signals ($\theta_1$, $\theta_2$, $\theta_3$) are thereby obtained and can be imposed to the pitch actuator.

In an embodiment the filtering of the selected signal comprises applying a bandpass filter including the backward whirling frequency or the forward whirling frequency. That is a bandpass filter placed around the edgewise vibration frequency f shifted either backwards or forwards by the rotor frequency, that is a bandpass filter placed at either (f−1P) or (f+1P).

In general, a backward whirling edge frequency is to be understood as an edgewise frequency of a given order, f, subtracted with the rotor frequency. Typically the edgewise frequency is the first order edgewise frequency and the rotor frequency is 1P. However other orders may be relevant in certain situations. A forward whirling frequency is a corresponding frequency but where the edgewise frequency of a given order, f, is added with the rotor frequency 1P.

The filtering includes, either as an integrated function or as a separate function, the application of a gain to counteract the edgewise loads to a predefined degree, as determined by the gain. In particular, the filtering of the selected signal applies an inverse gain to the selected signal. That is the signal being multiplied with a negative value. By applying an inverse gain, it may be ensured that the filtered signal is in opposite phase with the selected signal. Thereby it may be ensured that the applied moment by the pitching is applied to reduce the vibration.

Figure 4:
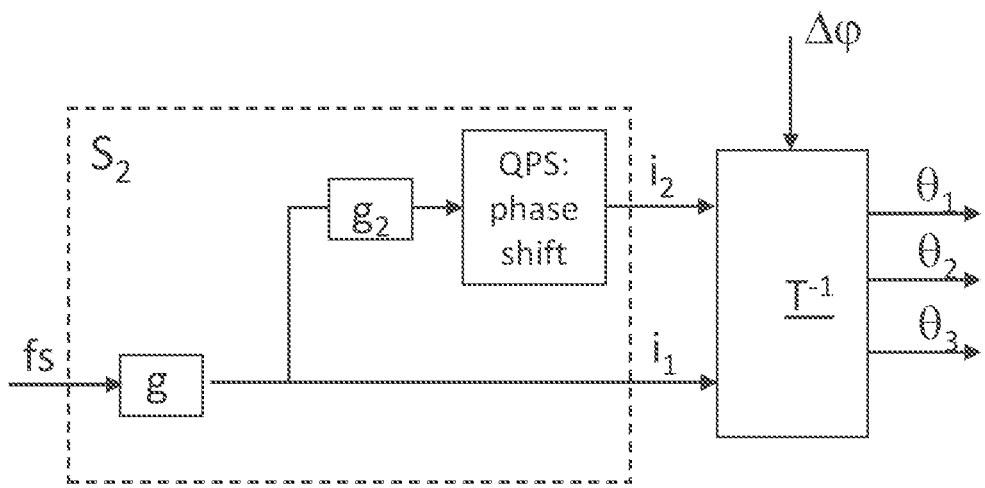
FIG. 4 illustrates an embodiment of the selector $S_2$.

The inverse m-blade coordinate transformation may take as input a first signal $i_1$ and a second signal $i_2$. The second signal may in a general embodiment be set to be zero. In this embodiment, the selector $S_2$ set the first signal $s_1$ as the filtered signal component fs and the second signal $s_2$ to be zero. However in embodiments the second signal may be determined by further filtering the filtered signal with a further signal filter with a quadrature phase shift filter phase response (QPS). This is illustrated in FIG. 4.

A quadrature phase shift filter shifts the phase with 90°, and the second signal is thus determined as the first signal with a 90 degrees phase shift.

In an embodiment, the 90 degrees phase shift is obtained by applying a filter in the form of a leaky integrator to the first signal. The leaky integrators can be implemented as 1st order low pass filters tuned with a break frequency below the rotor frequency.

By determining the second signal as the first signal with a 90 degrees phase shift, the pitch modification signal is obtained as:

$$\theta_k = A\sin\left((\omega t \mp \Omega t) + \phi \pm \frac{2\pi}{3}(k-1)\right)$$

where the sign (±) depend upon whether or not the second signal is shifted +90° or −90°.

Thus, the signal filter (QPS) may be implemented for selecting either a positive filter phase response or a negative filter phase response.

An advantage of applying the filter with a quadrature phase shift filter phase response (QPS) to obtain the second signal is that the aspect of splitting the frequency content by the Coleman transform in the pitch actuation signal can be avoided (or at least reduced). The frequency content being split into a low frequency component and a high frequency component centred around the input frequency. Thereby if the quadrature phase shift filter is not applied, the resulting pitch modification signals will include frequency content at both the high frequency and at the low frequency. That is the pitch modification signals will include frequency content at the edgewise frequency f+1P and f−1P. In an embodiment, where the quadrature phase shift filter is not applied the reduced frequency content in the actuation signals may still be obtained by use of notch filters applied to each of the pitch modification signals ($\theta_1, \theta_2, \theta_3$). The notch filter being applied to notch out either the frequency content at f+1P or at f−1P depending on the frequency content that should be removed. Typically the f+1P content should be removed so as to avoid the high frequency pitching in order to reduce the fatigue exposure of the pitch actuators. The notch filter having a predefined bandwidth to ensure a proper frequency interval being notched out.

FIG. 4 further illustrates optional gains to be applied either as a common gain g, or as an individual gain $g_2$.

In an embodiment a common gain g is applied as an adjustment gain with a gain scheduling term, the gain scheduling term being dependent upon an operational point of the wind turbine. The operational point being a point in a multidimensional parameter space spanned by two or more of the parameters generator speed, pitch angle, electrical power, electrical torque, wind speed, as well as further parameters used for controlling the wind turbine. By applying a gain scheduling dependent on the operational point, the activity of the control feature can be tailored to give operational conditions, both to ensure that the control system is sufficiently active in relevant operational points, and to ensure that the control system is only applied in a specified operational space and thereby only reducing the activity level of the pitch system in order not to incur unnecessary fatigue.

The rotor control system may further comprise an activation element, the activation element being dependent upon an operational point of the wind turbine. The activation element may be implemented in the gain scheduling as a zero gain when the control system is deactivated. Other implementations of an activation element are also possible. The activation element may also be dependent upon an operational point of the wind turbine. In this manner it can be ensured that the controller is active in operational conditions such as turbulence or other conditions where there is an elevated risk of edgewise vibrations building up. The activation element may include a hysteresis to ensure that the controller is not flipping on and off in certain conditions. The activation element may also include a timer to ensure that the controller is active for a certain time thereby increasing the likelihood that the vibration is broken.

By applying an individual gain ($g_2$) on the second input $i_2$ the resulting frequency spectrum of the pitch actuation may be tuned to a specific mix of actuation frequencies and the resulting vibrational reduction effect may be tuned in view of a specific turbine structure.

In an embodiment the inverse m-blade coordinate transformation $T^{-1}$ may include a phase shift $\Delta\varphi$ to adjust the phase of the filtered signal component. By including a phase shift into the inverse transform the actual timing of when the pitch actuation is applied can be adjusted. This may be needed in order to compensate for computational time delays or system delays, such as delays incurred by the pitch actuator.

Figure 5:
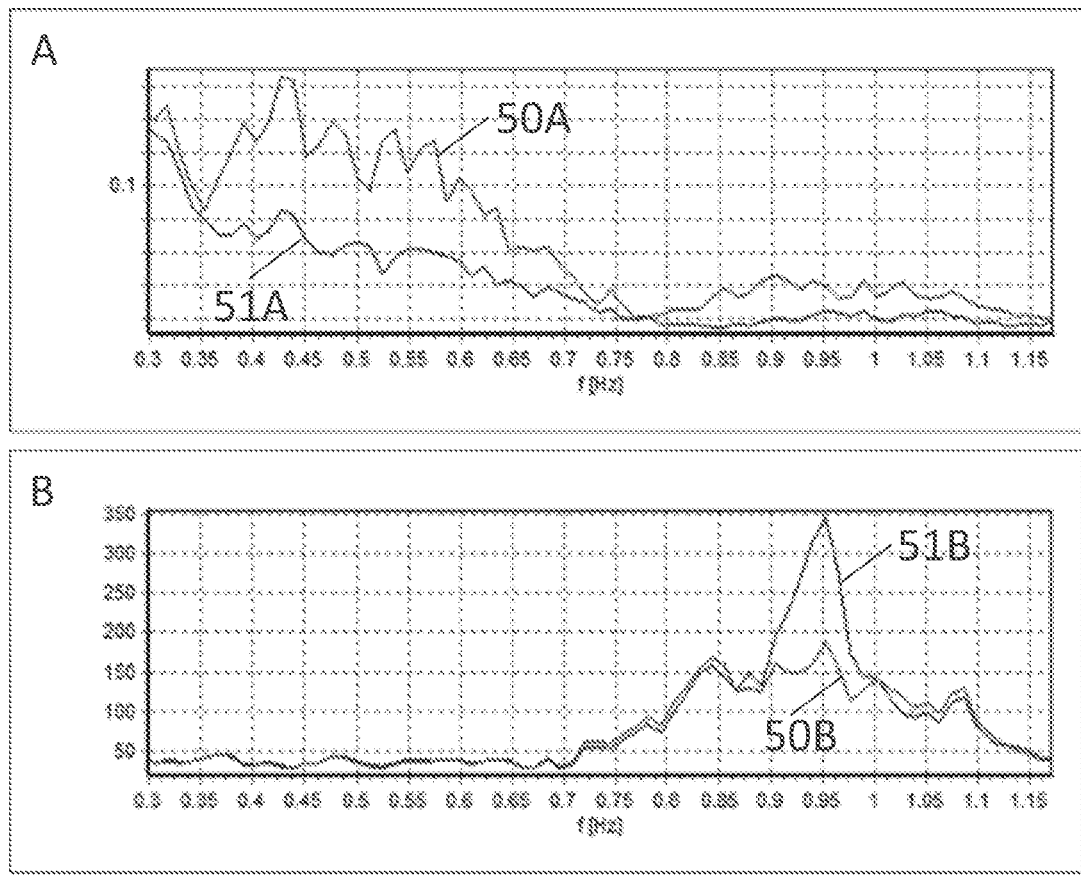
FIG. 5 illustrates simulated signals by applying the embodiment illustrated in FIGS. 3 and 4.

FIG. 5 illustrates the effect of applying the control system according to an embodiment of the present invention.

FIG. 5 illustrates simulated signals by applying the embodiment illustrated in FIGS. 3 and 4 for a wind turbine with a torsional soft tower in a high wind situation. Both plots show FFT plots of pitch signals in 5A and of blade root loads signals in the edgewise direction in 5B, of a selected blade. The plots marked 50A and 50B show the pitch activity (50A) and the resulting edgewise load signal (50B) in a situation where the control system is active, and the plots marked 51A and 51B show the pitch activity (51A) and the resulting edgewise load signal (51B) in a situation where the control system is in-active. As can be seen, a higher pitch activity in accordance with embodiments of the present invention results in that the edgewise vibrations (as expressed by the edgewise loads) are significantly reduced.

Example embodiments of the invention have been described for the purposes of illustration only, and not to limit the scope of the invention as defined in the accompanying claims.

The invention claimed is:

1. A rotor control system for actuating pitch of pitch adjustable rotor blades of a wind turbine, the rotor control system comprising:
   a pitch actuating unit for determining a pitch modification signal to be applied to a pitch actuator for actuating the pitch of the pitch adjustable rotor blades; the pitch actuation unit being arranged to:
      receive an edgewise load signal for each of the pitch adjustable rotor blades, the edgewise load signal being measured in a rotating reference frame;
      apply an m-blade coordinate transformation to the edgewise load signal to transform the edgewise load signal to a whirling reference frame along a first and a second reference direction;
      select a signal component of either the first or the second reference direction to obtain a selected signal component;
      filter the selected signal component at either a backward whirling frequency or a forward whirling frequency to obtain a filtered signal component;
      apply an inverse m-blade coordinate transformation to the filtered signal component to obtain the pitch modification signal, wherein only a whirling mode of either backward or forward whirling is targeted in obtaining the pitch modification signal; and
      apply the pitch modification signal to the pitch actuator.

2. The rotor control system according to claim 1, wherein the selected signal component is filtered to couple an output of the m-blade coordinate transformation to a selected backward whirling component of an edgewise vibration or a selected forward whirling component so that the filtered signal component reflects a magnitude of the selected component of the backward or forward whirling in the whirling reference frame of the edgewise vibration.

3. The rotor control system of claim 1 wherein the filtering of the selected signal comprises applying a bandpass filter including the backward whirling frequency or the forward whirling frequency.

4. The rotor control system of claim 1 wherein the filtering of the selected signal includes an inverse gain to the selected signal.

5. The rotor control system of claim 1, wherein the inverse m-blade coordinate transformation taking as input a first signal and a second signal; and wherein the second signal is determined by further filtering the filtered signal with a further signal filter with a quadrature phase shift filter phase response.

6. The rotor control system according to claim 5, wherein the further signal filter is a leaky integrator.

7. The rotor control system of claim 5, wherein the further signal filter is selectable for either a positive filter phase response or a negative filter phase response.

8. The rotor control system of claim 1, wherein the m-blade coordinate transformation is based on a Coleman transformation.

9. The rotor control system of claim 1 further comprising:
determine a collective pitch reference for the pitch adjustable rotor blades, the collective pitch reference being determined based on a rotor speed,
apply a resulting pitch modification signal to the pitch adjustable rotor blades, the resulting pitch modification signal being applied to the pitch adjustable rotor blades individually, and for each individual blade being based on a combined signal of the collective pitch reference and the individual pitch modification signals.

10. The rotor control system of claim 1 further comprising an adjustment gain with a gain scheduling term, the gain scheduling term being dependent upon an operational point of the wind turbine.

11. The rotor control system of claim 1 wherein the inverse m-blade coordinate transformation further includes a phase shift to adjust a phase of the filtered signal component.

12. The rotor control system of claim 1 wherein the pitch modification signal is filtered with a notch filter around either an edgewise vibration frequency forward whirling frequency or around an edgewise vibration frequency backward whirling frequency.

13. The rotor control system of claim 1 further comprising an activation element, the activation element being dependent upon an operational point of the wind turbine.

14. A method of actuating pitch of pitch adjustable rotor blades of a wind turbine, the wind turbine comprising a pitch actuator for actuating the pitch of the pitch adjustable rotor blades, the method comprising:
receiving an edgewise load signal for each of the pitch adjustable rotor blades, the edgewise load signal being measured in a rotating reference frame;
applying an m-blade coordinate transformation to the edgewise load signal to transform the edgewise load signal to a whirling reference frame along a first and a second reference direction;
selecting a signal component of either the first or the second reference direction to obtain a selected signal component;
filtering the selected signal component at either a backward whirling frequency or a forward whirling frequency to obtain a filtered signal component;
applying an inverse m-blade coordinate transformation to the filtered signal component to obtain a pitch modification signal, wherein only a whirling mode of either backward or forward whirling is targeted in obtaining the pitch modification signal; and
applying the pitch modification signal to the pitch actuator.

15. A wind turbine, comprising:
a tower;
a nacelle disposed on the tower;
a rotor extending from the nacelle and having a plurality of pitch adjustable rotor blades disposed thereon; and
a pitch actuating unit to determine a pitch modification signal to be applied to a pitch actuator for actuating the pitch of the pitch adjustable rotor blades; the pitch actuation unit being arranged to:
receive an edgewise load signal for each of the pitch adjustable rotor blades, the edgewise load signal being measured in a rotating reference frame;
apply an m-blade coordinate transformation to the edgewise load signal to transform the edgewise load signal to a whirling reference frame along a first and a second reference direction;
select a signal component of either the first or the second reference direction to obtain a selected signal component;
filter the selected signal component at either a backward whirling frequency or a forward whirling frequency to obtain a filtered signal component;
apply an inverse m-blade coordinate transformation to the filtered signal component to obtain the pitch modification signal, wherein only a whirling mode of either backward or forward whirling is targeted in obtaining the pitch modification signal; and
apply the pitch modification signal to the pitch actuator.

16. A computer program product comprising a non-transitory computer readable medium storing software code adapted to control a wind turbine when executed on a data processing system, the data processing system being adapted to perform, upon execution of the software code, an operation of actuating pitch of pitch adjustable rotor blades of a wind turbine, the wind turbine comprising a pitch actuator for actuating the pitch of the pitch adjustable rotor blades, the operation comprising:
receive an edgewise load signal for each of the pitch adjustable rotor blades, the edgewise load signal being measured in a rotating reference frame;
apply an m-blade coordinate transformation to the edgewise load signal to transform the edgewise load signal to a whirling reference frame along a first and a second reference direction;
select a signal component of either the first or the second reference direction to obtain a selected signal component;
filter the selected signal component at either a backward whirling frequency or a forward whirling frequency to obtain a filtered signal component;
apply an inverse m-blade coordinate transformation to the filtered signal component to obtain a pitch modification signal, wherein only a whirling mode of either backward or forward whirling is targeted in obtaining the pitch modification signal; and
apply the pitch modification signal to the pitch actuator.

* * * * *